United States Patent
Kwon

(10) Patent No.: US 11,822,915 B2
(45) Date of Patent: Nov. 21, 2023

(54) METHOD FOR SELECTING THE LAST PATCH FROM AMONG A PLURALITY PATCHES FOR SAME LOCATION AND THE LAST PATCH SELECTION MODULE

(71) Applicant: SURESOFT TECHNOLOGIES INC., Seoul (KR)

(72) Inventor: Min Hyuk Kwon, Yongin-si (KR)

(73) Assignee: SURESOFT TECHNOLOGIES INC., Seoul (KR)

( * ) Notice: Subject to any disclaimer, the term of this patent is extended or adjusted under 35 U.S.C. 154(b) by 105 days.

(21) Appl. No.: 17/560,031

(22) Filed: Dec. 22, 2021

(65) Prior Publication Data

US 2023/0130772 A1   Apr. 27, 2023

(30) Foreign Application Priority Data

Oct. 22, 2021 (KR) .......................... 10-2021-0141792

(51) Int. Cl.
*G06F 8/65* (2018.01)

(52) U.S. Cl.
CPC ..................................... *G06F 8/65* (2013.01)

(58) Field of Classification Search
None
See application file for complete search history.

(56) References Cited

U.S. PATENT DOCUMENTS

| | | | |
|---|---|---|---|
| 9,965,633 B2 * | 5/2018 | Brucker | H04L 63/1433 |
| 10,133,657 B2 | 11/2018 | Yoshida et al. | |
| 10,853,051 B2 | 12/2020 | Saha et al. | |
| 11,042,467 B2 | 6/2021 | Mahajan et al. | |
| 11,080,179 B2 * | 8/2021 | Landsborough | G06F 11/3688 |
| 11,119,751 B2 * | 9/2021 | Hwang | G06N 20/00 |
| 11,257,574 B1 * | 2/2022 | Boussios | G06N 5/022 |
| 11,526,424 B2 * | 12/2022 | Deng | G06N 3/084 |
| 2016/0004626 A1 * | 1/2016 | Jain | G06F 11/3684 |
| | | | 717/130 |
| 2017/0242782 A1 | 8/2017 | Yoshida et al. | |
| 2017/0300691 A1 * | 10/2017 | Upchurch | G06F 21/12 |
| 2020/0249928 A1 * | 8/2020 | Zeng | G06F 8/656 |
| 2020/0249929 A1 * | 8/2020 | Saha | G06F 11/3664 |
| 2021/0011712 A1 * | 1/2021 | Grant | G06F 11/3616 |
| 2021/0056006 A1 * | 2/2021 | Mahajan | G06F 8/427 |
| 2021/0082003 A1 * | 3/2021 | Kellogg | G06Q 30/0256 |

(Continued)

FOREIGN PATENT DOCUMENTS

| | | | |
|---|---|---|---|
| CN | 110442517 A | * | 11/2019 |
| CN | 112685320 A | * | 4/2021 |

(Continued)

OTHER PUBLICATIONS

Korean Intellectual Property Administration, Office Action, KR Patent Application No. 10-2021-0141792, dated Apr. 17, 2023, nine pages.

*Primary Examiner* — Philip Wang
*Assistant Examiner* — Rongfa P Wang
(74) *Attorney, Agent, or Firm* — Fenwick & West LLP

(57) ABSTRACT

A method of selecting a last patch from among a plurality of patches for a same location according to an embodiment of this invention includes generating a plurality of patches for a same location in a program; calculating a final score based on a code change rate, a code complexity, and a context similarity for each of the plurality of patches.

16 Claims, 2 Drawing Sheets

(56) References Cited

U.S. PATENT DOCUMENTS

| | | | |
|---|---|---|---|
| 2021/0141718 A1* | 5/2021 | Sandhu | G06F 8/60 |
| 2021/0182031 A1* | 6/2021 | Ye | G06F 8/77 |
| 2021/0224053 A1* | 7/2021 | Tiwari | G06N 20/00 |
| 2022/0108010 A1* | 4/2022 | Bishop, III | G06F 8/436 |
| 2022/0148001 A1* | 5/2022 | Rafferty | G06N 3/08 |
| 2022/0164175 A1* | 5/2022 | Masis | G06F 3/0484 |
| 2022/0179639 A1* | 6/2022 | Manley | G06F 21/57 |
| 2022/0300280 A1* | 9/2022 | Rafey | G06N 3/0464 |
| 2023/0040047 A1* | 2/2023 | Gadepalli | G06F 9/45558 |
| 2023/0169635 A1* | 6/2023 | Arroyo | G06N 3/08 |
| | | | 382/157 |

FOREIGN PATENT DOCUMENTS

| | | | |
|---|---|---|---|
| CN | 114897738 A * | | 8/2022 |
| JP | 2017-151977 A | | 8/2017 |
| JP | 2020-126603 A | | 8/2020 |
| JP | 2021-034007 A | | 3/2021 |
| KR | 20200041028 A * | | 1/2013 |

* cited by examiner

METHOD FOR SELECTING THE LAST PATCH FROM AMONG A PLURALITY PATCHES FOR SAME LOCATION AND THE LAST PATCH SELECTION MODULE

CROSS-REFERENCE TO RELATED APPLICATIONS

This application claims priority to and the benefit of Korean Patent Application No. 10-2021-0141792 filed in the Korean Intellectual Property Office on Oct. 22, 2021, the entire contents of which are incorporated herein by reference.

TECHNICAL FIELD

The present invention relates to a method of selecting a last patch from among a plurality of patches for a same location and a last patch selection module. The present invention relates to a method of selecting a last patch from among a plurality of patches for a same location and a last patch selection module capable of providing one patch most suitable for a user from among a plurality of patches.

BACKGROUND ART

The Automatic Program Repair (APR) system is a system that automatically generates correction codes for bugs that may exist in a program.

The APR system generates and outputs multiple modification codes, which are referred to as multiple patch codes or patches.

Conventional APR systems actually show a number of patches to a user and wait for the user's selection, which is not efficient. Therefore, there is a need for a method of automatically determining which patch is most efficient among the plurality of patches for the purpose of showing the user.

SUMMARY OF THE INVENTION

The present invention provides a method of automatically selecting and outputting the most efficient patch among a plurality of candidate patches generated by an APR system. The present invention provides a method of selecting a last patch from among a plurality of patches for a same location.

In addition, the present invention provides a last patch selection module capable of evaluating a plurality of candidate patches, scoring each patch, and selecting only the patch with the highest score and showing it to a user.

A method of selecting a last patch from among a plurality of patches for a same location according to an embodiment of the present invention includes the following steps of: generating a plurality of patches for the same location in a program; calculating a final score based on a code change rate, a code complexity, and a context similarity for each of the plurality of patches; and outputting a patch having a largest final score among the plurality of patches as the last patch.

The last patch selection module according to another embodiment of the present invention includes: a patch generator which generates a plurality of patches for a same location in a program; and a patch selector calculating a final score for each of the plurality of patches based on a code change rate, a code complexity, and a context similarity, and outputting a patch having a largest final score among the plurality of patches as a last patch.

A method of selecting a last patch from among a plurality of patches for a same location and a last patch selection module according to an embodiment of the present invention may automatically select and output the most efficient patch from among a plurality of candidate patches generated by an APR system.

In addition, according to the present invention, there is an advantage in that a plurality of candidate patches may be evaluated, a score may be given to each patch, and only the patch having the highest score may be selected and shown to the user.

In addition, according to the present invention, by allowing only one last patch to be selected by itself, complete automation is possible, and even if a plurality of patches can be selected, there is an advantage that can help develop a user-friendly system.

DETAILED DESCRIPTION

Hereinafter, embodiments of the present invention will be described in more detail with reference to the accompanying drawings. Among the components of the present invention, a detailed description of what may be clearly understood and easily reproduced by those skilled in the art will be omitted in order not to obscure the subject matter of the present invention.

Figure 1:
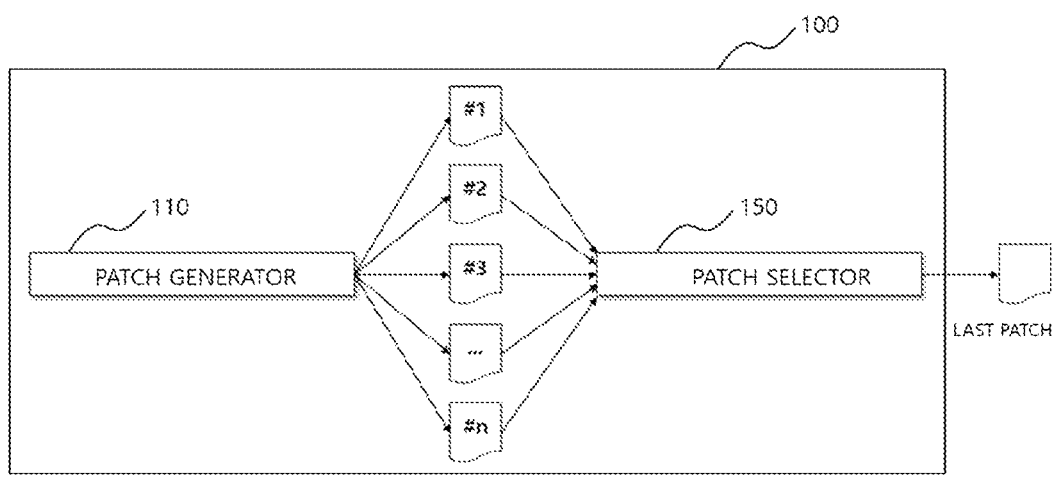
FIG. 1 is a block diagram schematically illustrating a last patch selection module 100 according to an embodiment of the present invention.

FIG. 1 is a block diagram schematically illustrating a last patch selection module 100 according to an embodiment of the present invention.

Referring to FIG. 1, the last patch selection module 100 according to an embodiment of the present invention includes a patch generator 110 and a patch selector 150.

The patch generator 110 uses APR technology to automatically generate and output a plurality of patches #1, #2, #3, and . . . #n for the same location of software.

The patch selector 150 receives the plurality of patches #1, #2, #3, and . . . #n output from the patch generator 110, selects the most suitable last patch from among the plurality of patches #1, #2, #3, and . . . #n received, and outputs the selected last patch.

The criterion for selecting the last patch by the patch selector 150 from among a plurality of patches #1, #2, #3, and . . . #n includes a code change rate, a code complexity, and a context similarity.

As for the code change rate, the highest score is given when the existing code is modified. When a code is deleted or added, the score is lowered in inverse proportion to the amount. Here, the score range may be 0 to 100. The score can be modified in accordance with the software characteristics.

As for the code complexity, if an added or modified code contains a logical equation, the score is evaluated low by judging it as a more complex code. Here, the score range may be 0 to 100. The score can be modified in accordance with the software characteristics.

Regarding the context similarity, a high score is given when the similarity is high by evaluating how similar the patched code is to the existing context (structural, code shape). Here, the score range may be 0 to 100. The score can be modified in accordance with the software characteristics.

Hereinafter, a method in which the patch selector 150 selects a last patch from a plurality of patches #1, #2, #3, and . . . #n will be described in detail with reference to FIG. 2.

Figure 2:
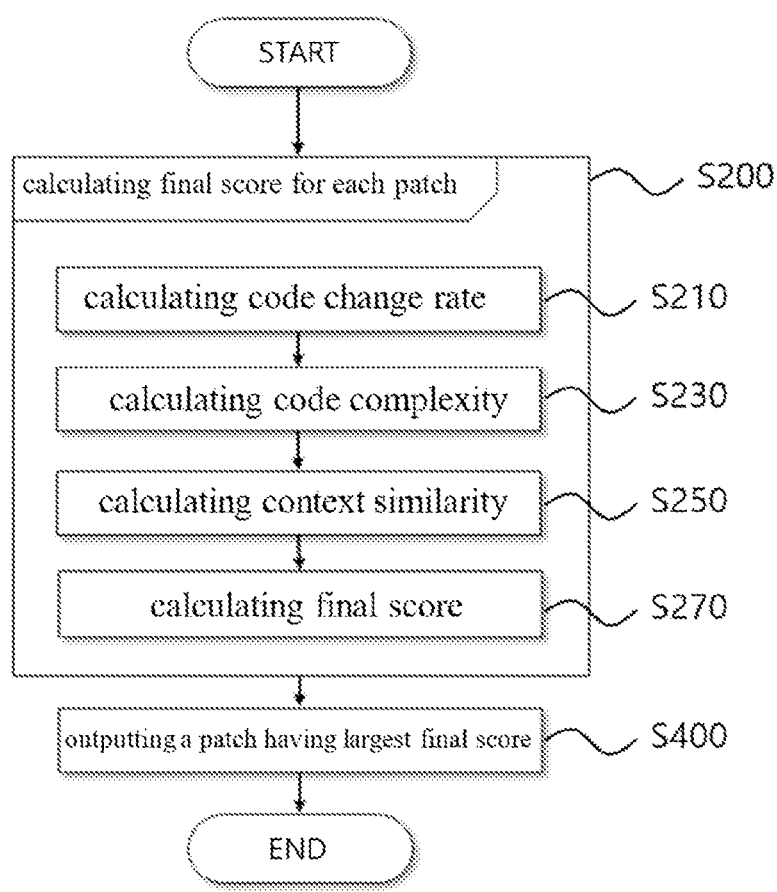
FIG. 2 is a flowchart illustrating a method in which the patch selector 150 shown in FIG. 1 selects a last patch from among a plurality of patches #1, #2, #3, . . . , #n.

FIG. 2 is a flowchart illustrating a method of selecting a last patch from among a plurality of patches #1, #2, #3, and . . . #n by the patch selector 150 illustrated in FIG. 1.

Referring to FIG. 2, the method of selecting the last patch by the patch selector 150 of FIG. 1 includes a step S200 of calculating a final score for each patch, and a step S400 of outputting a patch having the largest final score among the plurality of patches.

The step S200 of calculating the final score for each patch may include a step S210 of calculating the code change rate for each patch #1, #2, #3, and . . . #n, a step S230 of calculating the code complexity, a step S250 of calculating the context similarity, and a step S270 of calculating the final score.

The step S210 of calculating the code change rate is a step of calculating the code change rate of the corresponding patch. For each line of the patch, whether to delete, add, or modify is displayed. For each item, as shown in Equation 1 below, it can be scored from 0 to 100 points.

Code change rate=100−(100/total number of changed lines)*number of deleted or added lines) [Equation 1]

Regarding "Equation 1", as for examples:

Example 1) if 5 lines among all 5 changed lines are deleted: 0 point

Example 2) if 2 lines among all 5 changed lines are deleted and 3 lines are modified: 60 points Example 3) if 5 lines among all 5 changed lines are modified: 100 points.

In step S230 of calculating the code complexity, only the added or modified code is calculated. The code complexity may be calculated based on a patch file variance score, an inter-modification variance score, and a logical complexity. Hereinafter, a method of calculating the patch file variance score, the inter-modification variance score, and the logical complexity will be described in detail.

First, a method of calculating the 'patch file variance score' will be described.

Depending on the bug type, there are cases where multiple files need to be patched. Since changing many files is a burden for reviewing patches, the more files there are, the less points can be given, as shown in Equation 2 below.

Patch file variance score=100/(number of modified files) [Equation 2]

Next, a method of calculating the 'inter-modification variance score' will be described.

The inter-modification variance score evaluates how many correction points are distributed for one file. Good patches are often isolated to solve specific problems, so low scores are given if the variance value is too high. The equation for calculating the variance score among corrections is shown in Equation 3 below.

Inter-modification variance score=(100/(maximum variance value of patch))*(variance value of current patch) [Equation 3]

In Equation 3 above, the variance value of the current patch can be obtained by calculating variance values (referred to as 'variance for changes in a file') for each file modified by the current patch, and calculating their average value. For example, if the current patch modifies three files, it evaluates how many modified codes are distributed for each of the three files (variance for changes in a file), and then the average value thereof becomes the variance value of the current patch.

The 'variance for changes in a file' value is an average of the variance values for the change locations in each change file, as shown in Equation 4 below.

$$(\text{variance}, V) = \frac{1}{N}\sum\nolimits_{i=1}^{n}(x_i - m)^2 f_i \quad \text{[Equation 4]}$$

In Equation 4 above, N is the number of all modification positions of one file, n is the number of all modification positions of one file (same as N, used instead of meta-symbol N in Sigma), xi is the i-th modification line position of the current file, and fi is an auxiliary expression for weighting effect (typically constant 1).

In Equation 3 above, in order to score the inter-modification variance score from 0 to 100, the maximum variance value must be known. Accordingly, the variance values of the other patches are all calculated and then the maximum variance value is evaluated.

Next, a method of calculating 'logical complexity' will be described.

The more conditional expressions of the program (the conditions included in the if statement, the while statement, or the conditions included in the logical calculation formula) in the patch, it means the more specific patches were created. Whereas, on the other hand, the more conditional expressions there are, the more difficult it is to read and understand. With the number of conditions as a boundary, the more conditions are included the lower the score is given.

Specifically, the score of the logical complexity may be determined by the following 1) to 4).

1) If the sum of the number of logical operators and the number of conditional statements is less than 3, then 100 points is assigned.

2) If the sum of the number of logical operators and the number of conditional statements is less than 5, then 50 points is assigned.

3) If the sum of the number of logical operators and the number of conditional statements is less than 7, then 25 points is assigned.

4) Other than that, then 0 point is assigned.

The 'final code complexity' may be calculated based on the previously calculated variance scores and logical complexity. Specifically, the final code complexity may be calculated using Equation 5 below.

Code complexity=(SQRT(patch file variance score*variance score among modifications)*0.5+(logical complexity*0.5) [Equation 5]

In the step S250 of calculating the context similarity, it may be calculated as follows based on the graph similarity between the code before modification and the code after the patch application.

The fact that the structure of the code has changed a lot means that it has changed a lot from the control flow of the original code. Ordinary patches often proceed while maintaining the existing code structure. Therefore, if it is not similar, a low score is given.

Context similarity can be calculated by Equation 6 below.

Context similarity=100*(graph similarity) [Equation 6]

In Equation 6 above, the graph similarity usually has a normalized value between 0.0 and 1.0. 1.0 means the same, and 0.0 means completely different.

As for graph similarity, various methods have been proposed, and in the embodiment of the present invention, those disclosed in the following academic papers have been used. Nikolic, M. (2010). *Measuring Similarity of Graphs and their Nodes by Neighbor Matching*. ArXiv, abs/1009.5290.

The graph similarity measurement method disclosed in the above academic paper will be briefly described as follows.

$$x_{ij}^{k+1} \leftarrow \frac{s_{in}^{k+1}(i,j) + s_{out}^{k+1}(i,j)}{2}. \quad \text{[Equation 7]}$$

In Equation 7 above, i means a node of Graph 1, and j means a node of Graph 2. The similarity of i and j means that the neighboring node of i is similar to the neighboring node of j. Accordingly, the average values of neighbor node similarity $S_{in}$ and $S_{out}$ are obtained to obtain the similarity of each point of the graph.

$$s_{in}^{k+1}(i,j) \leftarrow \frac{1}{m_{in}} \sum_{l=1}^{n_{in}} x_{f_{ij}^{in}(l)g_{ij}^{in}(l)}^{k} \quad \text{[Equation 8]}$$

$$m_{in} = \max(id(i), id(j))$$

$$n_{in} = \min(id(i), id(j))$$

$$s_{out}^{k+1}(i,j) \leftarrow \frac{1}{m_{out}} \sum_{l=1}^{n_{out}} x_{f_{ij}^{out}(l)g_{ij}^{out}(l)}^{k}$$

$$m_{out} = \max(od(i), od(j))$$

$$n_{out} = \min(od(i), od(j))$$

$S_{in}$ and $S_{out}$ are calculated by adding all the similarities of the neighboring nodes.

In the step S270 of calculating the final score, the final score is calculated based on the code change rate calculated in S210, the code complexity calculated in S230, and the context similarity value calculated in S250. Specifically, as shown in Equation 9 below, the score obtained by multiplying each of the code change rate, the code complexity, and the context similarity by certain predetermined weight values and then adding all of them may be the final score.

The final score=(code change rate*weight 1)+(code
complexity*weight 2)+(context
similarity*weight 3) [Equation 9]

In Equation 9 above, the weight 1, the weight 2, and the weight 3 may be values predefined by the user as percentages. Here, the weights 1, 2, and 3 may be set differently according to the purpose of the final score.

For example, when the purpose of the final score prioritizes a smallest change, the weight 1 may be 0.6, the weight 2 may be 0.2, and the weight 3 may be 0.2. Alternatively, when the purpose of the final score prioritizes simple logic, the weight 1 may be 0.2, the weight 2 may be 0.6, and the weight 3 may be 0.2. Alternatively, when the purpose of the final score is the harmonized score, the weight 1 may be 0.33, the weight 2 may be 0.33, and the weight 3 may be 0.33.

When the patch selector 150 of FIG. 1 calculates the final score for each patch through step S200 described above, the patch selector 150 selects the patch having the largest final score among the scores for each patch as the last patch and outputs the selected last patch.

Meanwhile, a patch selection method for selecting a last patch from among candidate patches for a same location according to an embodiment of the present invention may be performed through a computer-readable recording medium including a program command for performing an operation implemented by a computer. The computer-readable recording medium may include a program command, a data file, a data structure, or the like alone or in combination. The recording media may be specially designed and configured for embodiments or may be known to or usable by those skilled in the art. Examples of computer-readable recording media include magnetic media such as hard disks, floppy disks and magnetic tapes, optical recording media such as CD-ROMs, DVDs, magnetic-optical media such as floptical disks, and hardware devices specifically configured to store and perform program instructions such as ROM, RAM, and flash memory. Examples of program instructions include machine language codes, such as those created by compilers, as well as advanced language codes that can be executed by computers using interpreters or the like.

Features, structures, effects, etc. described in embodiments are included in at least one embodiment of this invention and are not necessarily limited to one embodiment. Furthermore, the features, structures, effects, and the like illustrated in each embodiment may be implemented in combination or modification with respect to other embodiments by a person skilled in the art to which the embodiments belong. Therefore, it should be interpreted that the contents related to these combinations and modifications are included in the scope of the present invention.

In addition, although the embodiment has been mainly described above, this is merely an example and this invention is not limited, and it will be appreciated by a person skilled in the art that various modifications and applications not illustrated are possible within the scope not departing from the present invention. That is, each component specifically shown in the embodiment may be modified and implemented. And differences related to these modifications and applications should be interpreted as falling within the scope of the present invention as defined in the appended claims.

EXPLANATION OF REFERENCE NUMBERS

100: Patch selection module
110: Patch generator
150: Patch selector

What is claimed is:

1. A method of selecting a last patch from among a plurality of patches for a same location, comprising steps of:

generating a plurality of patches for the same location in a program;

calculating a final score based on a code change rate, a code complexity, and a context similarity for each of the plurality of patches; and outputting a patch having a largest final score among the plurality of patches as the last patch, wherein the code change rate is scored based on a following Equation:

Code change rate=100−(100/total number of changed
lines)*number of deleted or added lines). <Equation>

2. The method of selecting a last patch from among a plurality of patches for a same location of claim 1, wherein the final score for each of the plurality of patches is scored based on a following Equation:

$$\text{The final score} = (\text{code change rate} * \text{weight 1}) + (\text{code complexity} * \text{weight 2}) + (\text{context similarity} * \text{weight 3}). \quad \text{<Equation>}$$

3. A method of selecting a last patch from among a plurality of patches for a same location, comprising steps of:
generating a plurality of patches for the same location in a program;
calculating a final score based on a code change rate, a code complexity, and a context similarity for each of the plurality of patches; and
outputting a patch having a largest final score among the plurality of patches as the last patch
wherein the code complexity is scored based on a patch file variance score, an inter-modification variance score, and a logical complexity.

4. The method of selecting a last patch from among a plurality of patches for a same location of claim 3, wherein the code complexity is scored based on a following Equation:

$$\text{Code complexity} = (\text{SQRT}(\text{patch file variance score} * \text{variance score among modifications}) * 0.5 + (\text{logical complexity} * 0.5). \quad \text{<Equation>}$$

5. The method of selecting a last patch from among a plurality of patches for a same location of claim 3, wherein
the patch file variance score is calculated based on Equation 1 below,
the inter-modification variance score is calculated based on Equation 2 below, and
the logical complexity is calculated based on Equation 3 below:

$$\text{Patch file variance score} = 100/(\text{number of modified files}) \quad \text{<Equation 1>}$$

$$\text{Inter-modification variance score} = (100/(\text{maximum variance value of patch})) * (\text{variance value of current patch}) \quad \text{<Equation 2>}$$

<Equation 3> sum of number of logical operators and number of conditional statements is less than 3, =100 points,
sum of number of logical operators and number of conditional statements is less than 5, =50 points,
sum of number of logical operators and number of conditional statements is less than 7, =25 points, and
other than that, =0.

6. The method of selecting a last patch from among a plurality of patches for a same location of claim 3, wherein the final score for each of the plurality of patches is scored based on a following Equation:

$$\text{The final score} = (\text{code change rate} * \text{weight 1}) + (\text{code complexity} * \text{weight 2}) + (\text{context similarity} * \text{weight 3}). \quad \text{<Equation>}$$

7. A method of selecting a last patch from among a plurality of patches for a same location, comprising steps of:
generating a plurality of patches for the same location in a program;
calculating a final score based on a code change rate, a code complexity, and a context similarity for each of the plurality of patches; and
outputting a patch having a largest final score among the plurality of patches as the last patch,
wherein the context similarity is scored based on a following Equation:

$$\text{Context similarity} = 100 * (\text{graph similarity}). \quad \text{<Equation>}$$

8. The method of selecting a last patch from among a plurality of patches for a same location of claim 7, wherein the final score for each of the plurality of patches is scored based on a following Equation:

$$\text{The final score} = (\text{code change rate} * \text{weight 1}) + (\text{code complexity} * \text{weight 2}) + (\text{context similarity} * \text{weight 3}). \quad \text{<Equation>}$$

9. A last patch selection module comprising:
a patch generator which generates a plurality of patches for a same location in a program, and
a patch selector calculating a final score for each of the plurality of patches based on a code change rate, a code complexity, and a context similarity, and outputting a patch having a largest final score among the plurality of patches as a last patch,
wherein the patch selector scores the code change rate based on ae following Equation:

$$\text{Code change rate} = 100 - (100/\text{total number of changed lines}) * \text{number of deleted or added lines}). \quad \text{<Equation>}$$

10. The last patch selection module of claim 9, wherein the patch selector scores the final score for each of the plurality of patches based on a following Equation:

$$\text{The final score} = (\text{code change rate} * \text{weight 1}) + (\text{code complexity} * \text{weight 2}) + (\text{context similarity} * \text{weight 3}). \quad \text{<Equation>}$$

11. A last patch selection module comprising:
a patch generator which generates a plurality of patches for a same location in a program, and
a patch selector calculating a final score for each of the plurality of patches based on a code change rate, a code complexity, and a context similarity, and outputting a patch having a largest final score among the plurality of patches as a last patch,
wherein the patch selector scores the code complexity based on a patch file variance score, an inter-modification variance score, and a logical complexity.

12. The last patch selection module of claim 11, wherein the patch selector scores the code complexity based on a following Equation:

$$\text{Code complexity} = (\text{SQRT}(\text{patch file variance score} * \text{variance score among modifications}) * 0.5 + (\text{logical complexity} * 0.5). \quad \text{<Equation>}$$

13. The last patch selection module of claim 11, wherein the patch selector that:
calculates the patch file variance score based on Equation 1 below,
calculates the inter-modification variance score based on Equation 2 below, and
calculates the logical complexity based on Equation 3 below:

$$\text{Patch file variance score} = 100/(\text{number of modified files}) \quad \text{<Equation 1>}$$

$$\text{Inter-modification variance score} = (100/(\text{maximum variance value of patch})) * (\text{variance value of current patch}) \quad \text{<Equation 2>}$$

<Equation 3> sum of number of logical operators and number of conditional statements is less than 3, =100 points, sum of number of logical operators and number of conditional statements is less than 5, =50 points,
sum of number of logical operators and number of conditional statements is less than 7, =25 points, and
other than that, =0.

14. The last patch selection module of claim 11, wherein the patch selector scores the final score for each of the plurality of patches based on a following Equation:

The final score=(code change rate*weight 1)+(code complexity*weight 2)+(context similarity*weight 3). <Equation>

15. A last patch selection module comprising:
a patch generator which generates a plurality of patches for a same location in a program, and
a patch selector calculating a final score for each of the plurality of patches based on a code change rate, a code complexity, and a context similarity, and outputting a patch having a largest final score among the plurality of patches as a last patch,
wherein the patch selector scores the context similarity based on a following Equation:

Context similarity=100*(graph similarity). <Equation>

16. The last patch selection module of claim 15, wherein the patch selector scores the final score for each of the plurality of patches based on a following Equation:

The final score=(code change rate*weight 1)+(code complexity*weight 2)+(context similarity*weight 3). <Equation>

* * * * *